US011408736B2

United States Patent
Zhang et al.

(10) Patent No.: US 11,408,736 B2
(45) Date of Patent: Aug. 9, 2022

(54) MASTER CONTROL SYSTEM FOR SATELLITE IMAGE PROCESSING

(71) Applicant: Huazhong University of Science and Technology, Wuhan (CN)

(72) Inventors: Tianxu Zhang, Wuhan (CN); Yutian Zhou, Wuhan (CN); Zongyang Cui, Wuhan (CN); Lei Zhang, Wuhan (CN); Shoukui Yao, Wuhan (CN); Mingming Que, Wuhan (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 537 days.

(21) Appl. No.: 16/455,812

(22) Filed: Jun. 28, 2019

(65) Prior Publication Data

US 2019/0316908 A1 Oct. 17, 2019

Related U.S. Application Data

(63) Continuation-in-part of application No. PCT/CN2017/077098, filed on Mar. 17, 2017.

(30) Foreign Application Priority Data

Dec. 31, 2016 (CN) .......................... 201611268699.5

(51) Int. Cl.
*G01C 21/02* (2006.01)
*B64G 1/36* (2006.01)
(Continued)

(52) U.S. Cl.
CPC .......... *G01C 21/025* (2013.01); *B64G 1/361* (2013.01); *G01C 21/24* (2013.01); *G01S 3/781* (2013.01);
(Continued)

(58) Field of Classification Search
CPC ...... G01C 21/025; G01C 21/24; B64G 1/361; B64G 1/1021; G01S 3/781; G01S 3/7867;
(Continued)

(56) References Cited

FOREIGN PATENT DOCUMENTS

| CN | 101419278 | * | 4/2009 | ............... G01S 7/00 |
| CN | 104460427 | * | 3/2015 | ........... G05B 19/042 |
| CN | 104776848 | * | 7/2015 | ............. G01C 11/04 |

\* cited by examiner

*Primary Examiner* — Amara Abdi
(74) *Attorney, Agent, or Firm* — JCIPRNET

(57) ABSTRACT

A master control system for a remote-sensing satellite image processing device, the system including: a master control management module, a first FPGA module, and a second FPGA module. The master control management module is in connection and communication with the first FPGA module, the second FPGA module, and a housekeeping computer. The first FPGA module is in connection and communication with the second FPGA module and a remote-sensing satellite image processing device. The master control management module is adapted to perform assignment of tasks. The first FPGA module is adapted to communicate with a processor in the satellite image processing device, monitor an operation state of the satellite image processing device, send the operation state information to the master control management module, receive a task assignment command issued by the master control management module, and transmit the task assignment command to the satellite image processing device.

4 Claims, 6 Drawing Sheets

(51) Int. Cl.
    *G01C 21/24*     (2006.01)
    *G01S 3/781*     (2006.01)
    *G06F 9/38*      (2018.01)
    *G06F 9/48*      (2006.01)
    *G06T 7/246*     (2017.01)
    *G08B 13/196*    (2006.01)
    *G06V 20/13*     (2022.01)
(52) U.S. Cl.
    CPC .......... *G06F 9/3877* (2013.01); *G06F 9/4881* (2013.01); *G06T 7/246* (2017.01); *G06V 20/13* (2022.01); *G08B 13/1961* (2013.01)
(58) Field of Classification Search
    CPC ...... G01S 5/163; G06F 9/3877; G06F 9/4881; G06F 9/5011; G06K 9/0063; G06T 7/246; G08B 13/1961; G05B 2219/25257; G05B 19/042
    See application file for complete search history.

MASTER CONTROL SYSTEM FOR SATELLITE IMAGE PROCESSING

CROSS-REFERENCE TO RELATED APPLICATIONS

This application is a continuation-in-part of International Patent Application No. PCT/CN2017/077098 with an international filing date of Mar. 17, 2017, designating the United States, and further claims foreign priority benefits to Chinese Patent Application No. 201611268699.5 filed Dec. 31, 2016. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to a master control system for a remote-sensing satellite image processing device.

The tasks of a remote-sensing satellite image processing device are numerous and complex. Hence, there is a need to develop a control system that supervises the satellite image processing device and performs the tasks of planning and scheduling.

SUMMARY

The disclosure provides a master control system for a remote-sensing satellite image processing device. The system employs a CPU+2 Field Programmable Gate Array (FPGA) frame, where an embedded real-time operating system is transplanted to the CPU to serve as a master control management module for accomplishing state supervision and task scheduling of the remote-sensing satellite image processing device.

The FPGAs are used for image pre-processing and communication information integration and assignment, thus achieving a real-time, low-delay processing of data.

Disclosed is a master control system for a remote-sensing satellite image processing device, the system comprising: a master control management module, a first FPGA module, and a second FPGA module.

The master control management module is in connection and communication with the first FPGA module, the second FPGA module, and a housekeeping computer; the first FPGA module is in connection and communication with the second FPGA module and a remote-sensing satellite image processing device.

The master control management module is adapted to perform assignment of tasks, the tasks comprising state monitoring of the remote-sensing satellite image processing device, state feedback of the remote-sensing satellite image processing device, command receiving and parsing, fault-tolerance emergency processing, region division and temporal phase determination, satellite attitude estimation, and working/standby modes.

The first FPGA module is adapted to communicate with a processor in the satellite image processing device, monitor an operation state of the satellite image processing device, send the operation state information of the satellite image processing device to the master control management module, receive a task assignment command issued by the master control management module after the master control management module parses commands of the housekeeping computer, and transmit the task assignment command to the satellite image processing device, to control the processor in the satellite image processing device to execute a task corresponding to the task assignment commands.

The second FPGA module is adapted to perform star segmentation and marking on a photographed image with stars, to determine positions of the stars in the image, and send the positions of the stars in the image to the master control management module, so that the master control management module determines a visual axis pointing direction of a sensor in the image processing device, according to the positions of the stars in the image.

The master control management module is further adapted to determine priorities of the tasks, and to design a communication interface and a communication protocol suitable for a satellite environment.

The master control management module comprises:

a first receiving module, which is adapted to receive the operation state information of the satellite image processing device that is sent by the first FPGA module;

a first sending module, which is adapted to send the operation state information of the satellite image processing device to the housekeeping computer;

a second receiving module, which is adapted to receive and parse a command of the housekeeping computer;

a second sending module, which is adapted to, after parsing the command of the housekeeping computer, issue a task assignment command down to the satellite image processing device via the first FPGA module, so that the processor in the satellite image processing device executes a task corresponding to the task assignment command;

a temporal phase and region determination module, which is adapted to perform region division and temporal phase determination according to geometric positional relationships among sun, earth and the satellite;

a third sending module, which is adapted to send the region division and temporal phase determination result to the satellite image processing device via the first FPGA module, so that the satellite image processing device determines a target image filtering algorithm based on the region division and temporal phase determination result;

a satellite attitude determination module, which is adapted to determine a visual axis pointing direction of the sensor in the image processing device by means of a QUEST algorithm, based on the received positions of the stars in the image sent by the second FPGA module as well as the target image filtering algorithm;

a fault-tolerance processing module, which is adapted to design a redundant structure of a register, and enable a watchdog to generate an external signal for each time of underflow to reset the master control management module systematically when the master control management module is not under control, where, the register adopts a triple-module redundancy structure, and data in partial register file of a memory unit adopt EDAC protection by using Hamming code; and an operation-mode determination module, which is adapted to calculate height of an orbit according to position information of the satellite and earth, to determine a working/standby mode.

The satellite attitude determination module can comprise:

a third receiving module, which is adapted to receive position information of the stars in the image sent by the second FPGA module;

a reading module, which is adapted to read true position information of the stars in the image, from a star catalog library in a memory;

an angular distance matching module, which is adapted to match the stars in the image with stars having true positions, to find three stars that meet certain conditions; and a visual axis pointing direction determination unit, which is adapted to determine a visual axis pointing direction of the sensor of the satellite image processing device, by means of a QUEST algorithm, by utilizing the three stars meeting certain conditions.

The master control management module is further adapted to send a switching command to the remote-sensing satellite image processing device via the first FPGA module when an abnormality occurs in the operation state of the remote-sensing satellite image processing device, so as to allow the remote-sensing satellite image processing device to be switched to a backup machine for operation.

Advantages of the master control system for a remote-sensing satellite image processing device according to embodiments of the disclosure are summarized as follows:

(1) the master control system can monitor, control and manage a remote-sensing satellite image processing device, so that the tasks of the remote-sensing satellite image processing device can be completed in orbit safely and reliably; and (2) the master control system can process data of large-scale remote-sensing images quickly and efficiently.

DETAILED DESCRIPTION OF THE PREFERRED EMBODIMENTS

To further illustrate, embodiments detailing a master control system for a remote-sensing satellite image processing device are described below. It should be noted that the following embodiments are intended to describe and not to limit the disclosure.

The master control system is defined functionally as a supervisor on a satellite image processing device, and its primary function is to monitor the state of the satellite image processing device and implement task scheduling, to ensure normal operation of the entire satellite image processing device, and also responsible for coordinating interaction of information and data between the satellite image processing device and a housekeeping computer. In addition, it is also required to accomplish corresponding image processing work according to task requirements.

Figure 1:
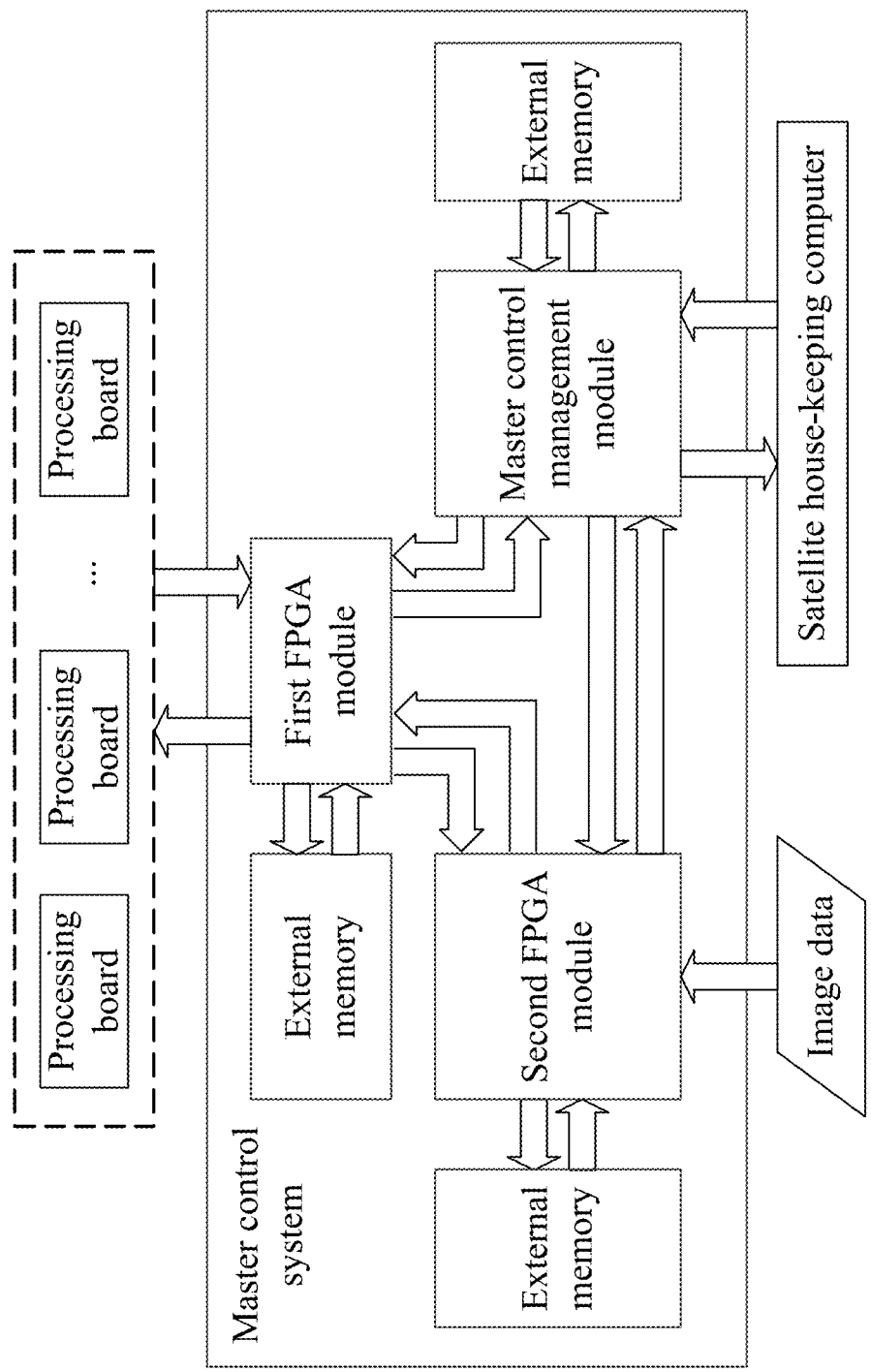
FIG. 1 is a schematic diagram of a master control system for a remote-sensing satellite image processing device according to one embodiment of the disclosure.

As shown in FIG. 1, a schematic diagram of the master control system for a remote-sensing satellite image processing device. The system comprises: a master control management module, a first FPGA module, and a second FPGA module.

The master control management module is in connection and communication with the first FPGA module, the second FPGA module and the housekeeping computer; the first FPGA module is in connection and communication with the second FPGA module and the satellite image processing device An embedded real-time operating system is transplanted into a CPU to serve as the master control management module, and the satellite image processing device represents the device used for image processing on the satellite.

The master control management module is adapted to perform appropriate assignment of tasks according to task requirements. The tasks comprise state monitoring of the remote-sensing satellite image processing device, state feedback of the remote-sensing satellite image processing device, command receiving and parsing, fault-tolerance emergency processing, region division and temporal phase determination, satellite attitude estimation, and working/standby modes.

The precise and proper assignment of the tasks will not only simplify the software design, but also enhance stability and robustness of the system, and also will make software debugging and error elimination easier. The main tasks of the system are: monitoring a state of the satellite image processing device, feeding back the state information of the satellite image processing device to the housekeeping computer, receiving a command of the housekeeping computer and accomplishing a corresponding function, temporal phase and region determination, satellite attitude estimation, fault-tolerance emergency processing, and a standby operation mode, etc.

The first FPGA module is adapted to communicate with a processor in the satellite image processing device, monitor an operation state of the satellite image processing device, send the operation state information of the satellite image processing device to the master control management module, receive a task assignment command issued by the master control management module after the master control management module parses commands of the housekeeping computer, and transmit the task assignment command to the satellite image processing device, to control the processor in the satellite image processing device to execute a task corresponding to the task assignment command.

The second FPGA module is adapted to perform star segmentation and marking on a photographed image with stars present therein, to determine positions of the stars in the image, and send the positions of the stars in the image to the master control management module, so that the master control management module determines a visual axis pointing direction of a sensor in the image processing device, according to the positions of the stars in the image.

The master control management module is further adapted to determine priorities of the divided tasks, and to design a communication interface and a communication protocol suitable for a satellite environment.

Figure 6:
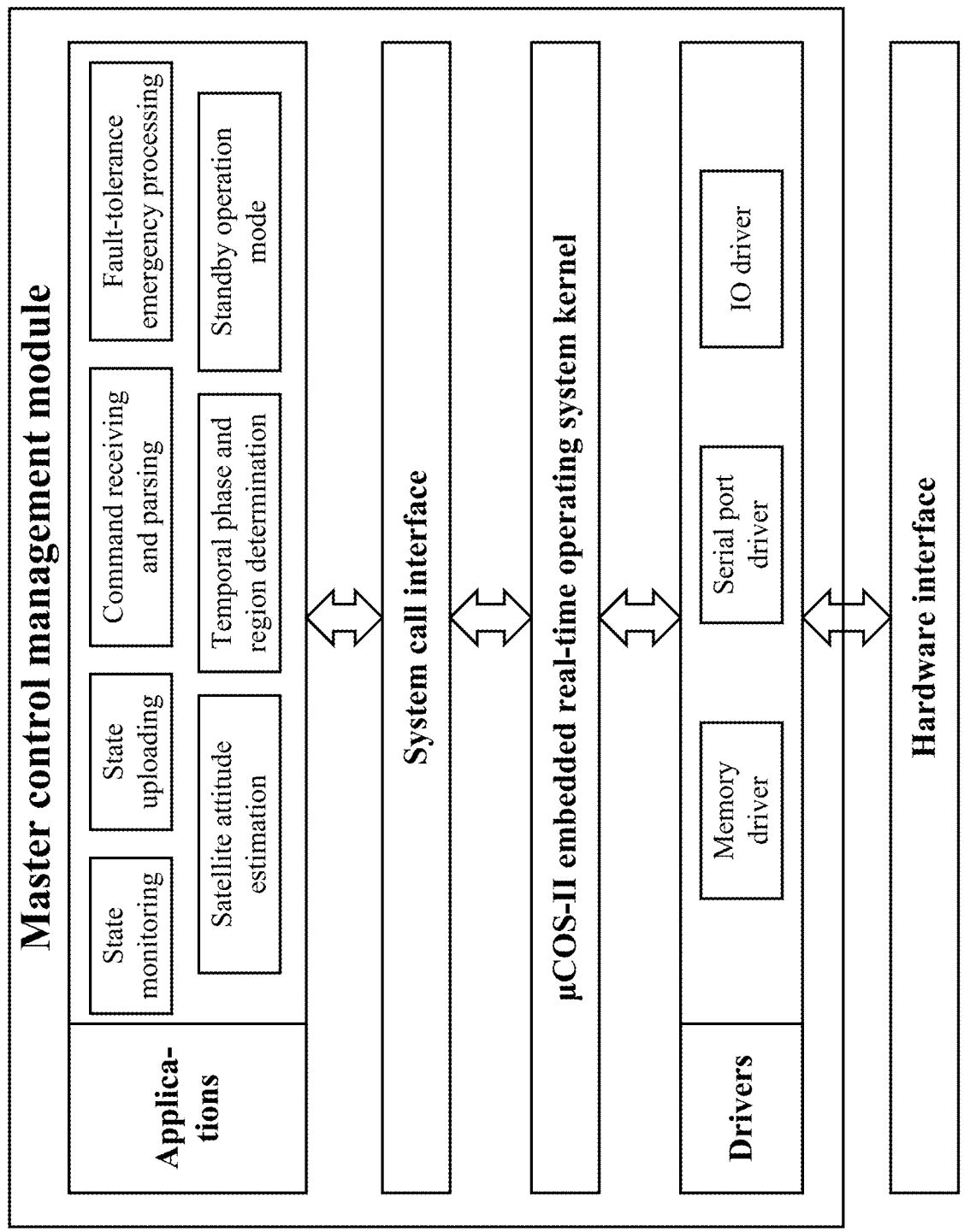
FIG. 6 is a structural diagram showing kernel architecture of an operating system of a master control management module according to one embodiment of the disclosure.

On the basis of the transplanted embedded real-time operating system, priorities of the tasks can be determined. As shown in FIG. 6, FIG. 6 is a structural diagram showing kernel architecture of an operating system of the master control management module. Specifically, the master control management module shown in FIG. 6 adopts a µCOS-II embedded real-time operating system, and µCOS-II can manage up to 64 tasks, corresponding to priority levels 0-63 respectively, where, 0 represents the highest priority, 63 represents the lowest priority and has been occupied by the system and cannot be used by a user. Proper setting of task priorities can not only ensure correctness of task scheduling, but also can provide better guarantee for real-time property of the system. A basic principle for task priority setting is to determine according to importance of tasks, sequence of synchronization of tasks, as well as execution time. Thus, based on the above determination criteria, priorities of the above-mentioned tasks can be determined, in the order from high to low, as follows: state monitoring of the remote-sensing satellite image processing device, state feedback of the remote-sensing satellite image processing device, command receiving and parsing, fault-tolerance emergency processing, temporal phase and region determination, satellite attitude estimation, working/standby modes.

Because the satellite image processing device needs to communicate and interact with the housekeeping computer, and the processors on the satellite image processing device also need communicate with each other, plus that the satellite environment is complex, there is thus a need to design a safe and reliable communication protocol for dealing with the satellite environment. The design must not only take into account comprehensiveness of the communication protocol, but also consider fault-tolerance and security of the communication protocol. In this example, a transmission protocol based on a fixed length is adopted, which is composed of a protocol header, protocol content, a protocol tail, and checksum information.

Figure 5:
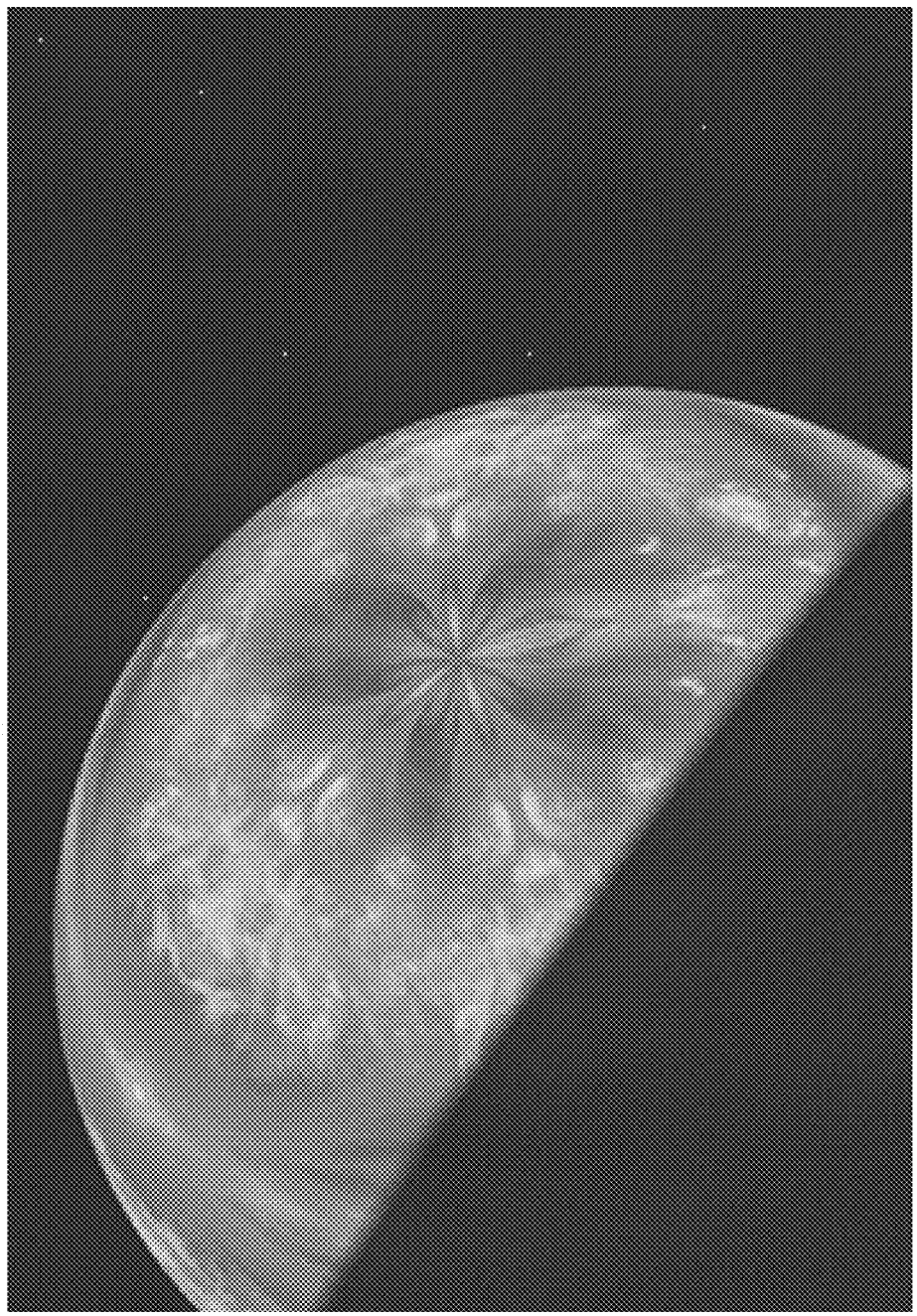
FIG. 5 is a simulation diagram of a deep space region of the earth.

The master control management module comprises:
a first receiving module, which is adapted to receive the operation state information of the satellite image processing device that is sent by the first FPGA module;
a first sending module, which is adapted to send the operation state information of the satellite image processing device to the housekeeping computer;
a second receiving module, which is adapted to receive and parse a command of the housekeeping computer;
a second sending module, which is adapted to, after parsing the command of the housekeeping computer, issue a task assignment command down to the satellite image processing device via the first FPGA module, so that the processor in the satellite image processing device executes a task corresponding to the task assignment command;
a temporal phase and region determination module, which is adapted to perform region division and temporal phase determination according to geometric positional relationships among sun, earth and the satellite;
a third sending module, which is adapted to send the region division and temporal phase determination result to the satellite image processing device via the first FPGA module, so that the satellite image processing device determines a target image filtering algorithm based on the region division and temporal phase determination result; differences in regions and seasons, as well as in days and nights, cause differences of background radiation measurement of imaging sensors of the satellite image processing device, there is thus a need to adopt different filtering algorithms for images; the master control management module can, based on geometric positional relationships among sun, earth and the satellite, flexibly calculate required parameters and rapidly perform region division and temporal phase determination, thus determining the image filtering algorithms, as shown in FIG. 5, FIG. 5 is a simulation diagram of a deep space region of earth in implementation of region division;
a satellite attitude determination module, which is adapted to determine a visual axis pointing direction of the sensor in the image processing device by means of a QUEST algorithm, based on the received positions of the stars in the image sent by the second FPGA module as well as the target image filtering algorithm;
a fault-tolerance processing module, which is adapted to design a redundant structure of a register, and enable a watchdog to generate an external signal for each time of underflow to reset the master control management module when the master control management module is not under control, where, the register adopts a triple-module redundancy structure, and data in partial register file of a memory unit adopt EDAC protection by using Hamming code;
an operation-mode determination module, which is adapted to calculate height of an orbit according to position information of the satellite and earth, to determine a working/standby mode.

Figure 4:
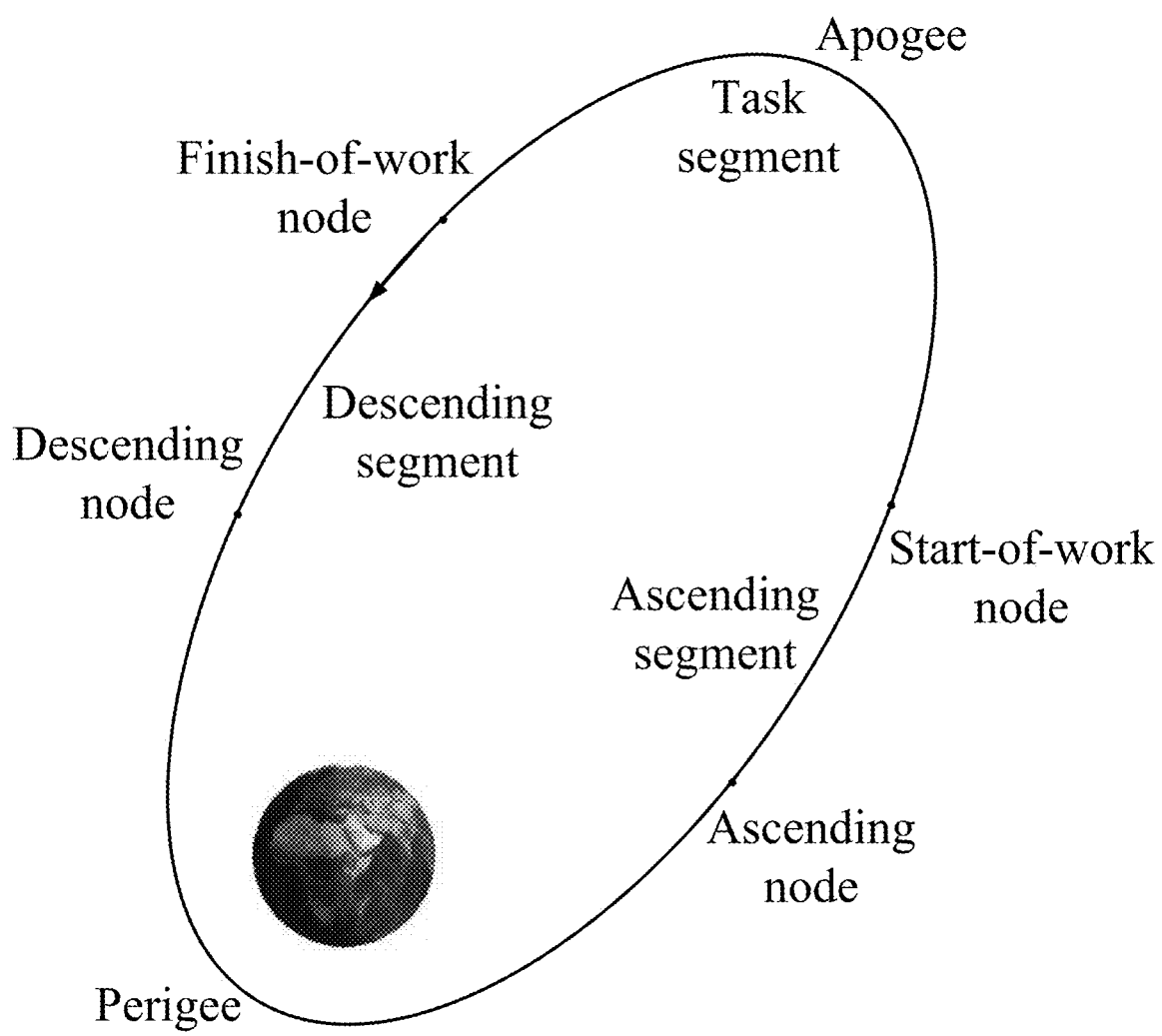
FIG. 4 is a schematic diagram showing a working segment of a remote-sensing satellite image processing device according to one embodiment of the disclosure.

The orbit of the satellite image processing device is divided into a working segment and a resting segment according to different orbiting height, and the distance between the satellite and earth is calculated based on positional relationships between the satellite and earth. When the satellite image processing device locates in the working segment, the master control system is in a normal working state; when the satellite image processing device locates in the resting segment, it can be switched to a standby operation mode by writing an arbitrary value into a Power-down register, as shown in FIG. 4, FIG. 4 is a schematic diagram showing a working segment of the remote-sensing satellite image processing device.

The satellite attitude determination module comprises:
a third receiving module, which is adapted to receive position information of the stars in the image sent by the second FPGA module;
a reading module, which is adapted to read true position information of the stars in the image, from a star catalog library in a memory;
an angular distance matching module, which is adapted to match the stars in the image with stars having true positions, to find three stars that meet certain conditions; and
a visual axis pointing direction determination unit, which is adapted to determine a visual axis pointing direction of the sensor of the satellite image processing device, by means of a QUEST algorithm, by utilizing the three stars meeting certain conditions.

The master control management module is further adapted to send a switching command to the remote-sensing satellite image processing device via the first FPGA module when an abnormality occurs in the operation state of the remote-sensing satellite image processing device, so as to allow the remote-sensing satellite image processing device to be switched to a backup machine for operation.

Figure 2:
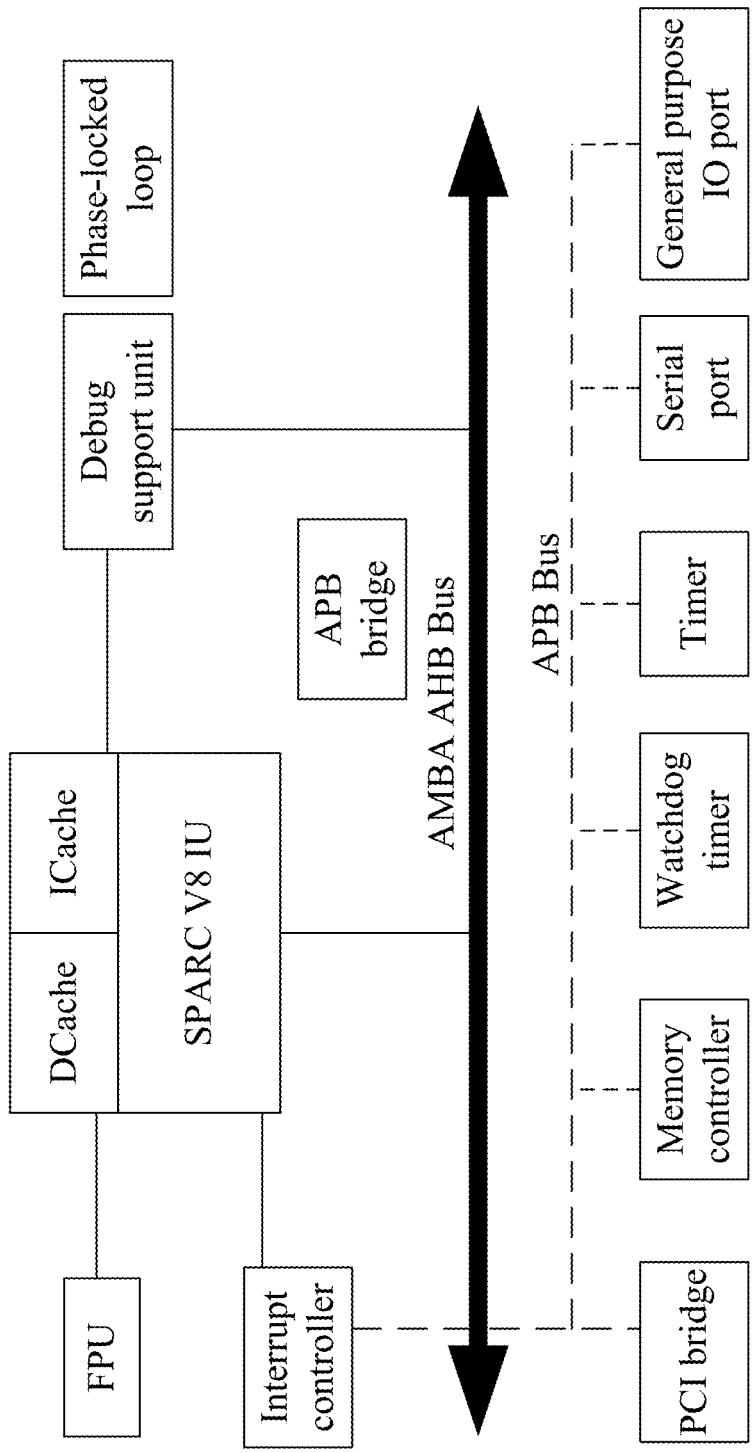
FIG. 2 is a schematic diagram of a master control management module of a master control system according to one embodiment of the disclosure.
Figure 3:
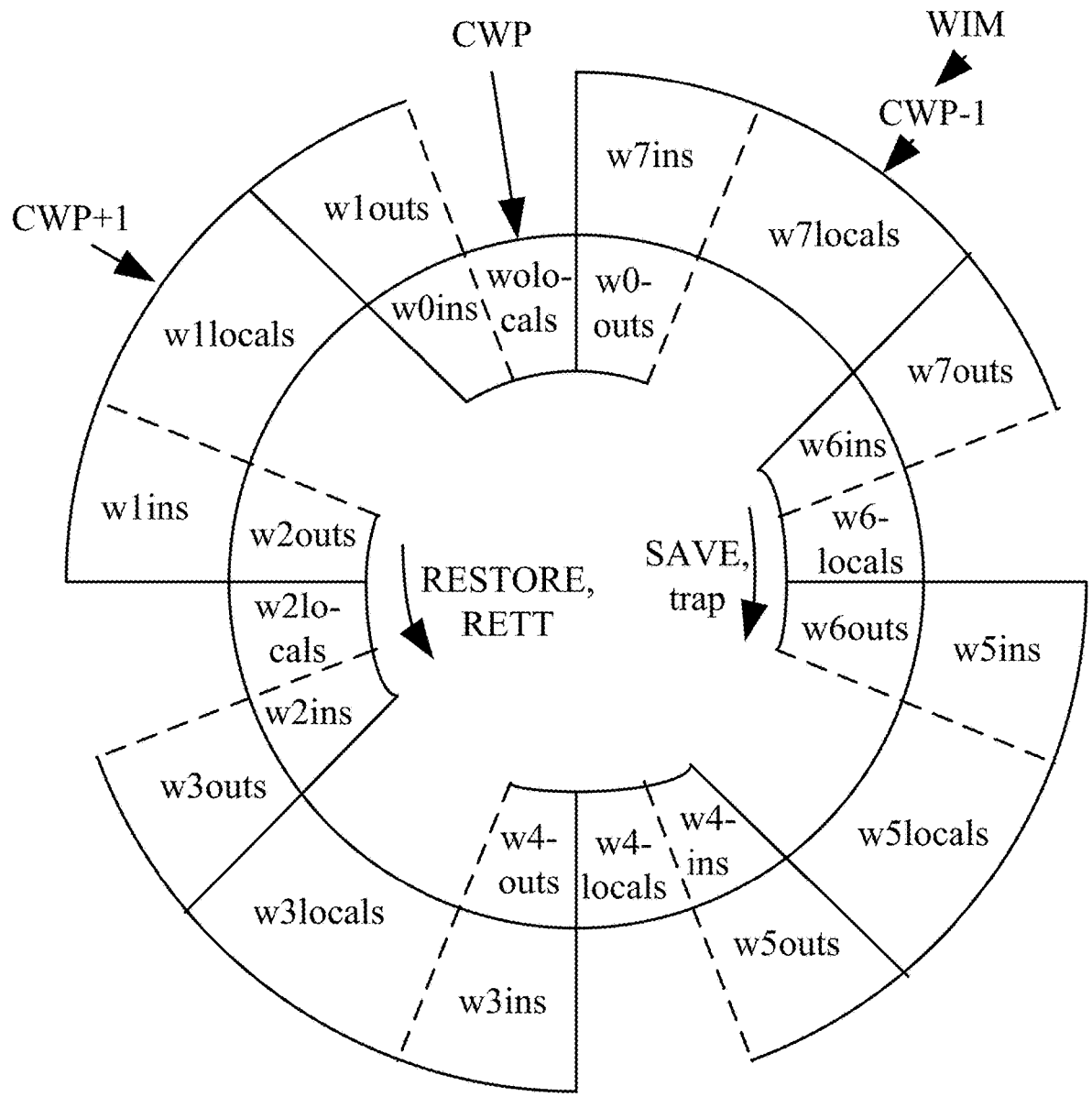
FIG. 3 is a schematic diagram of a window register of a master control management module of a master control system according to one embodiment of the disclosure.

The remote-sensing satellite image processing device may adopt a dual-machine hot backup operation mode; under normal circumstances, one machine works, while the other machine acts as a backup machine. When the master control management module monitors that an abnormality occurs in the state of the satellite image processing device, it can switch to the backup machine to take over the work of the faulty machine to ensure continuity of the system operation. In addition, the fault-tolerance design of the master control management module itself comprises two parts: all registers adopt a triple-module redundancy structure; and data in partial register file of a memory unit adopt EDAC (Error Detection and Correction) protection by using Hamming code, which can detect multi-bit errors and correct one-bit errors. As shown in FIG. 3, FIG. 3 is a schematic diagram of a window register of the master control management module in the master control system disclosed in the embodiment of the disclosure. In addition, when the master control management module is not under control, the watchdog will be enabled to generate an external signal for each time of underflow to reset the master control management module systematically, as shown in FIG. 2, FIG. 2 is a schematic diagram of the master control management module in the master control system disclosed in the embodiment of the disclosure. FIG. 2 and FIG. 3 show an optional CPU-BM3803MG used for the master control management module; BM3803MG is a domestic 32-bit RISC embedded processor based on SPARC V8 architecture, and can be used for an on-board embedded real-time computer system, and can meet functions and performance requirements of various aerospace applications, furthermore, by adding a memory and an application-related peripheral circuit to it, a complete single-board computer system can thus be constituted.

It will be obvious to those skilled in the art that changes and modifications may be made, and therefore, the aim in the appended claims is to cover all such changes and modifications.

What is claimed is:

1. A system, comprising: a master control management module, a first field programmable gate array (FPGA) module, and a second FPGA module;
    wherein:
    the master control management module is in connection and communication with the first FPGA module, the second FPGA module, and a housekeeping computer;
    the first FPGA module is in connection and communication with the second FPGA module and a remote-sensing satellite image processing device;
    the master control management module is configured to perform assignment of tasks, the tasks comprising state monitoring of the remote-sensing satellite image processing device, state feedback of the remote-sensing satellite image processing device, command receiving and parsing, fault-tolerance emergency processing, region division and temporal phase determination, satellite attitude estimation, and working/standby modes;
    the first FPGA module is configured to communicate with a processor in the satellite image processing device, monitor an operation state of the satellite image processing device, send operation state information of the satellite image processing device to the master control management module, receive a task assignment command issued by the master control management module, and transmit the task assignment command to the satellite image processing device;
    the second FPGA module is configured to determine positions of stars in an image, and send the positions of the stars in the image to the master control management module, so that the master control management module determines a visual axis pointing direction of a sensor in the image processing device, according to the positions of the stars in the image; and
    the master control management module is further configured to determine priorities of the tasks, and to design a communication interface and a communication protocol suitable for a satellite environment,
    wherein the master control management module comprises:
    a third sending module, which is configured to send a region division and temporal phase determination result to the satellite image processing device via the first FPGA module, so that the satellite image processing device determines a target image filtering algorithm based on the region division and temporal phase determination result;
    a satellite attitude determination module, which is configured to determine a visual axis pointing direction of the sensor in the image processing device by means of a QUEST algorithm, based on the received positions of the stars in the image sent by the second FPGA module as well as the target image filtering algorithm;
    a fault-tolerance processing module, which is configured to design a redundant structure of a register, and enable a watchdog to generate an external signal for each time of underflow to reset the master control management module systematically when the master control management module is not under control, where, the register adopts a triple-module redundancy structure, and data in partial register file of a memory unit adopt EDAC protection by using Hamming code; and
    an operation-mode determination module, which is configured to calculate a height of an orbit according to position information of the satellite and earth, to determine a working/standby mode.

2. The system of claim 1, wherein the master control management module further comprises:
    a first sending module, which is configured to send the operation state information of the satellite image processing device to the housekeeping computer;
    a second receiving module, which is configured to receive and parse a command of the housekeeping computer;
    a second sending module, which is configured to issue a task assignment command down to the satellite image processing device via the first FPGA module, so that the processor in the satellite image processing device executes a task corresponding to the task assignment command;
    a temporal phase and region determination module, which is configured to perform region division and temporal phase determination according to geometric positional relationships among sun, earth and the satellite.

3. The system of claim 1, wherein the satellite attitude determination module comprises:
    a third receiving module, which is configured to receive position information of the stars in the image sent by the second FPGA module;
    a reading module, which is configured to read true position information of the stars in the image, from a star catalog library in a memory;
    an angular distance matching module, which is configured to match the stars in the image with stars having true positions, to find three stars that meet certain conditions; and
    a visual axis pointing direction determination unit, which is configured to determine a visual axis pointing direction of the sensor of the satellite image processing device, by means of a QUEST algorithm, by utilizing the three stars.

4. The system of claim 3, wherein the master control management module is further configured to send a switching command to the remote-sensing satellite image processing device via the first FPGA module when an abnormality occurs in the operation state of the remote-sensing satellite image processing device.

* * * * *